Jan. 17, 1967  R. J. PURTELL  3,298,388
DRAINING SPRINKLER CONNECTORS
Filed Jan. 3, 1966  2 Sheets-Sheet 1
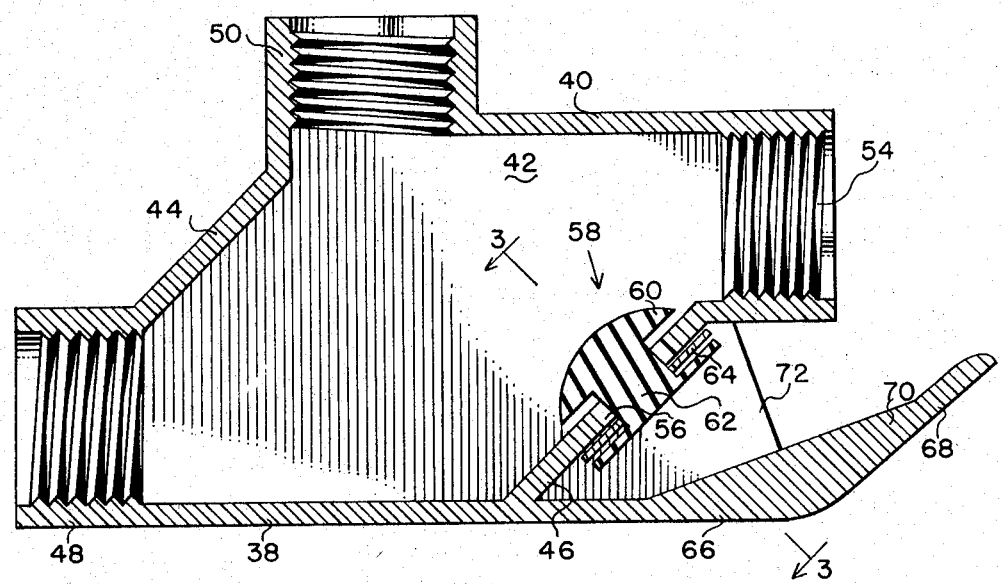
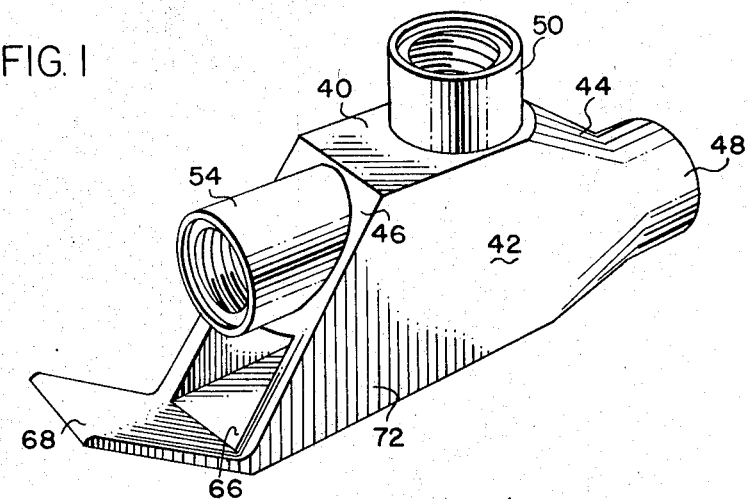
INVENTOR
RUFUS J. PURTELL
BY
Atty.

Jan. 17, 1967  R. J. PURTELL  3,298,388
DRAINING SPRINKLER CONNECTORS
Filed Jan. 3, 1966  2 Sheets-Sheet 2

INVENTOR
RUFUS J. PURTELL
BY
Atty.

United States Patent Office 3,298,388
Patented Jan. 17, 1967

3,298,388
DRAINING SPRINKLER CONNECTORS
Rufus J. Purtell, Brownfield, Tex., assignor to The J. B. Knight Co., Inc., Brownfield, Tex., a corporation of Texas
Filed Jan. 3, 1966, Ser. No. 518,303
4 Claims. (Cl. 137—382)

Under Rule 78, cross reference is made to the following five patent applications and the applications cross referenced therein:

| Application | | Patent | |
|---|---|---|---|
| Serial No. | Filing Date | Number | Issue Date |
| 236,474 | Nov. 5, 1962 | 3,157,193 | Nov. 17, 1964 |
| 264,507 | Mar. 12, 1963 | 3,245,608 | Apr. 12, 1966 |
| 331,087 | Dec. 12, 1963 | 3,230,969 | Jan. 25, 1966 |
| 351,338 | Mar. 12, 1964 | In Issue—Group 310 | |
| 385,942 | Jul. 29, 1964 | Pending in Group 360 | |

This invention relates to agricultural irrigation and more particularly to sprinkling water from a mechanically moved irrigation system.

As is seen in the disclosures of the above identified applications, it as advantageous when watering agricultural fields to have as many sprinklers as economically feasible so as to distribute the water over a large amount of land. One arrangement of sprinklers in such a system is to have a main pipeline carrying some sprinklers and having additional sprinklers attached to a small tube which trails behind the main line as the main line is moved. In this way, the number of sprinklers can be greatly increased without a substantial increase in cost.

It is desirable to drain the entire system when it is being moved to greatly decrease the weight of the entire system. Therefore, it is also necessary to drain the small trail tubes. I have developed a connection to connect the sprinkler riser to the trail tube adapted for draining, having a multitude of advantages.

An object of this invention is to provide a draining connector to connect a sprinkler riser to a trail tube.

Another object is to provide a draining connector which does not erode the ground when in use.

Another object is to provide a draining connector which is adapted to be connected in tandem series.

A further object is to provide a draining connector which may be reversed without fouling the drain.

Still further objects are to achieve the above with a device that is sturdy, compact, durable, simple, safe, versatile, and reliable, yet inexpensive and easy to operate.

The specific nature of the invention, as well as other objects, uses, and advantages thereof, will clearly appear from the following description and from the accompanying drawing, the different views of which are not necessarily to the same scale, in which:

FIG. 1 is a perspective view of a draining sprinkler connector according to this invention.

FIG. 2 is an axial sectional view of the connector.

Figure 4:
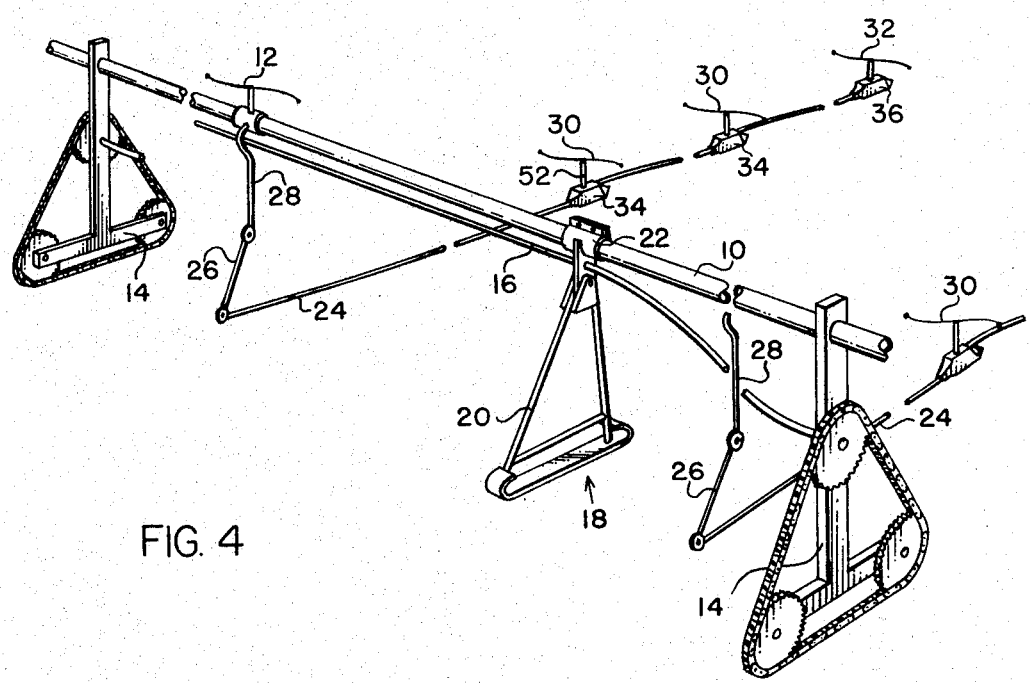
FIG. 4 is a perspective view of an irrigation system using the draining sprinkler connectors.

An agricultural irrigation system including pipe 10 which has a plurality of sprinklers 12 thereon is represented in FIG. 4. The pipe 10 is supplied with water under pressure from a source not shown. The pipe is provided with means for moving the pipe transverse to its axis in the form of a plurality of vehicles 14 which have been schematically represented in the drawing. The vehicles are powered by a line shaft 16 which is powered by a motor not shown. Rotation of the line shaft 16 furnishes power to each of the vehicles 14 which causes them to move.

In order to reduce the number of vehicles 14 required, moving supports 18 are provided between vehicles 14. These moving supports 18 include legs 20 which are pivoted to clamp 22 which is attached to the pipe 10. When the system is being moved, the legs swing to the rear of the pipe and drag along. When the desired destination is reached, the vehicles are reversed, causing the pipe to move over the legs 20 so that the system is supported by the moving supports 18 when it is full of water.

Trail tubes 24 are connected at frequent intervals along the pipe 10. The connection of the trail tubes is through a drag link 26. Specifically, a short, depending nipple 28 is structurally and fluidly connected to the bottom of the pipe 10. Drag link 26 is pivoted and fluidly connected to the bottom of the nipple 28. Trail tube 24 is pivoted to the bottom of the drag link 26. Therefore, upon analysis, it may be seen that, when the system is reversed to move the pipe 10 upon the legs 20, the trail tubes 24 are not intended to be pushed backwards.

Additional sprinklers 30 and 32 are connected into the trail tubes 24 by draining sprinkler connectors 34 and 36 respectively.

The draining sprinkler connectors 34 and 36 are preferably made identically so as to reduce the number of parts necessary for a dealer to stock in inventory. Also, three additional sprinklers 30 and 32 have been illustrated. It will be understood that one, two, three or four additional sprinklers could be connected to the pipe 10.

Each draining connector includes a hollow body having a bottom 38, a top 40, two sides 42, a front 44, and a back 46 (FIGS. 1 and 2). Preferably, it is cast from aluminum as a single piece. Front nipple or coupling 48 is integrally cast therewith and provides a threaded opening from the front of the body to connect trail tube 24 to the front thereof. Also, a riser nipple 50 is cast into the top 40 to provide a connection for riser 52 by which the added sprinkler 30 is attached. Rear nipple 54 is cast into the back 46 to provide a threaded opening to attach the extension of the trail tube 24 to extend to added draining sprinkler connector 36 therebehind. If the illustrated draining connector were the last in a series, the rear nipple 54 would be plugged with an ordinary pipe plug. As may be seen in the instant illustration, the front nipple 48 and rear nipple 54 are parallel with the front nipple being attached toward the bottom of the front and the rear nipple being attached toward the top of the back 46. Also, it may be seen that the riser nipple 50 is at right angles to the axis of the other two nipples in the top 40. The front nipple 48 is toward the bottom of the hollow body to enhance the sledding characteristics of the connector. It will be understood that, when the connector is moved from one location to another, it is drug along the ground as a sled and, therefore, it is necessary for the body to present a fair, smooth, contour to prevent the draining connector from snagging debris and becoming entangled with debris as it is being pulled along.

Figure 3:
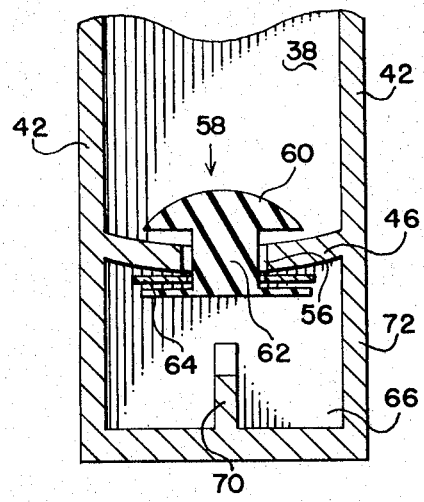
FIG. 3 is a partial sectional view showing details of construction taken substantially on line 3—3 of FIG. 2.

The bottom surface of the back 46 of the hollow body is curved to a radius of curvature greater than the radius of curvature for the three nipples 48, 50 and 54 (FIG. 3). Near the bottom of this curved back portion is a hole 56 for draining the connector and the trail tube 24 connected thereto. (The pipe 10 itself has drains therein, but, should they not drain all the water from the pipe 10, the water from the pipe 10 will drain through the trail tubes 24 into the connectors and on out the hole 56.)

Valve 58 extends through the hole 56. The valve 58 has a head 60 within the hollow body and a stem 62 extending through the hole 56 and a retainer 64 to the exterior of the hollow body. Such valves are well known and commercially on the market. They are made of rubber and their operation is that they have sufficient resilience so that, when there is water pressure upon the system, the water pressure will deform the head 60 sufficiently to form a seal with the curved back 46 of the body, therefore having a water-tight connection when there is pressure upon the system. When the pressure is reduced by turning off the water supply to the system for moving, the natural resilience of the head 60 will cause the head to move away from the curved back 46—permitting the water to drain through the hole 56. The diameter of the trail tubes 24 is so small that it is not practical to provide drain valves 58 within them and, therefore, there is the necessity that the radius of curvature of the back 46 be greater than the radius of curvature of the nipples 48, 50 and 54 which is the same radius of curvature of the trail tubes 24. It will be understood that there is no limit to the greatness of radius of curvature of the back 46 and, as this radius gets extremely large, the back 46 is a flat surface for practical consideration. It will be noted that the curved back is a portion of a cylinder and that the axis of this curvature is vertically aligned and inclined to the rear as opposed to being horizontal as is illustrated in the prior applications. It has been found that it is better to have the axis of the curvature to be parallel to the sides 42 for ease in casting; it being more difficult to cast with the axis at right angles to the sides as shown in the prior embodiments.

The back 46 angles rearwardly. One of the reasons for this is to improve the flow characteristics to reduce the impediment of the flow of the water to a minimum.

As may be seen clearly in the drawing, the cross sectional area of the connector 34 far exceeds the cross sectional area of the trail tube 24.

The bottom 38 of the hollow body extends to the rear of the back 46, forming a foot 66 or rear platform to the body. The rear portion of this foot 66 is turned upward at 68. This upturned rear portion of the foot performs two functions: One, it disburses the water flowing from the hole 56 and diverts it. Therefore, the velocity of the water flowing from the hole is reduced and it does not tend to erode the soil as much as otherwise. Specifically, if it were not turned up, all of the water would flow in a single stream at greater velocity straight behind the draining connector and tend to erode the soil to a greater degree than according to the present design. Two, the turned up portion 68 prevents fouling the drain valve 58 with debris should the tube 24 ever be reversed slightly. As pointed out previously, there is some possibility that, upon operation of the system, the trail tubes 24 will be moved backward. Therefore, this turned up portion protects the draining connector in this event. Furthermore, it aids in the draining connector's sliding backwards which is desirable. It would be highly undesirable to anchor the trail tubes 24 so it were impossible for them to slide backwards as might happen by a portion digging into the ground. It is always dangerous to try to push the trail tube backwards because the trail tube is made of very thin-walled aluminum tubing and to push it backwards always involves the danger of buckling the tubing and thereby destroying it.

It will be noted that there is a web 70 which is aligned with longitudinal axis of the body between the foot 66 and the upward turned portion 68. Also, it will be noted that the sides 42 extend backwards as a cover to that area where the drain valve 58 is located. These backward cover areas are designated with the numeral 72.

It will be apparent that the embodiment shown is only exemplary and that various modifications can be made in construction, materials, and arrangement within the scope of the invention as defined in the appended claims.

I claim as my invention:
1. A draining connector comprising:
 (a) a hollow body,
 (b) a coupling on the hollow body adapted to connect it to a tube to supply water thereto,
 (c) a second coupling on the hollow body at right angles to the first coupling adapted to connect a sprinkler thereto,
 (d) the hollow body having an underside, said underside extending to the rear of the hollow body to form a foot therebehind,
 (e) the rear portion of said foot being angled upward therefrom,
 (f) the hollow body having a back surface thereto extending upward from the underside,
 (g) the back surface having a hole therethrough near the bottom thereof, and
 (h) resilient valve means extending through the hole for closing the hole responsive to pressure in the hollow body.

2. The invention as defined in claim 1 with the addition of:
 (j) the sides of said hollow body extending to the rear of the back surface to either side of the valve, with the foot at least partially enclosing the area exterior of the hollow body wherein the valve is located.

3. In an irrigation sprinkler system, the subcombination comprising:
 (a) a trail tube of small diameter,
 (b) means for axially dragging said trail tube attached thereto,
 (c) means for supplying water under pressure to said trail tube attached thereto,
 (d) a hollow body fluidly and structurally attached to said trail tube,
 (e) an extension of said trail tube fluidly and structurally attached to said hollow body substantially aligned with said trail tube,
 (f) an opening in said hollow body,
 (g) a riser extending upward from said opening,
 (h) said riser forming means for attaching a sprinkler to said hollow body, and
 (j) valve means in said hollow body for draining water from said hollow body responsive to lack of pressure in said hollow body,
 (k) the cross sectional area of said hollow body far exceeding the cross sectional area of said trail tubes.

4. The invention as defined in claim 3 with the additional limitations of
 (m) the hollow body having a foot which extends from the underside of the bottom of the hollow body smoothly and rearwardly therefrom,
 (n) the rear portion of said foot being angled upward therefrom, and
 (o) said valve means being located above the foot so that it is sheltered from debris.

References Cited by the Applicant

UNITED STATES PATENTS

| | | |
|---|---|---|
| 1,693,459 | 11/1928 | Paulus et al. |
| 2,741,509 | 4/1956 | Melcher. |
| 2,910,996 | 11/1959 | Coover. |
| 3,157,193 | 11/1964 | Purtell. |

M. CARY NELSON, *Primary Examiner.*

H. KLINKSIEK, *Assistant Examiner.*